(12) United States Patent
Rae et al.

(10) Patent No.: US 11,378,550 B2
(45) Date of Patent: Jul. 5, 2022

(54) SURFACE EXTRACTION FOR ULTRASONIC IMAGES USING PATH ENERGY

(71) Applicant: DarkVision Technologies Inc, North Vancouver (CA)

(72) Inventors: Andrew J. Rae, Vancouver (CA); Eric Zillinger, North Vancouver (CA)

(73) Assignee: DarkVision Technologies Inc, North Vancouver (CA)

( * ) Notice: Subject to any disclaimer, the term of this patent is extended or adjusted under 35 U.S.C. 154(b) by 121 days.

(21) Appl. No.: 17/035,796

(22) Filed: Sep. 29, 2020

(65) Prior Publication Data

US 2021/0103052 A1    Apr. 8, 2021

(30) Foreign Application Priority Data

Oct. 4, 2019 (GB) ..................................... 1914401

(51) Int. Cl.
*G06K 9/00* (2022.01)
*G01N 29/06* (2006.01)
(Continued)

(52) U.S. Cl.
CPC ...... *G01N 29/0654* (2013.01); *G01S 15/8977* (2013.01); *G01S 15/8993* (2013.01); *G06T 7/0006* (2013.01); *G06V 10/235* (2022.01); *G01N 2291/0258* (2013.01); *G01N 2291/2636* (2013.01); *G06T 2207/10132* (2013.01); *G06T 2207/30108* (2013.01)

(58) Field of Classification Search
CPC ....... G01N 29/0654; G01N 2291/0258; G01N 2291/2636; G01N 2291/106; G01N 29/262; G01N 29/046; G01N 29/4409; G01N 29/48; G01S 15/8977; G01S 15/8993; G01S 7/539; G01S 15/89; G06T 7/0006; G06T 2207/10132; G06T 2207/30108; G06T 7/13; G06T 2207/10016; G06V 10/235; E21B 47/08
See application file for complete search history.

(56) References Cited

U.S. PATENT DOCUMENTS 3,693,415 A     9/1972  Whittington
10,441,235 B2 * 10/2019  Lavi ......................... G06T 7/11
(Continued)

FOREIGN PATENT DOCUMENTS

EP     0380436 A1    8/1990
GB     2572834 A    10/2019
(Continued)

OTHER PUBLICATIONS

Search report received for GB application No. 1914401.3, dated Feb. 13, 2020, 4 pages.

*Primary Examiner* — Shervin K Nakhjavan

(57) ABSTRACT

A system and method used to image cylindrical fluid conduits, such as pipes, wellbores and tubulars, with ultrasound transducers then process the ultrasound images to detect edges and surfaces. The device and method compute monotonic paths through high energy pixels. Functions are used for dropping, extending and selecting an optimal path based on certain criteria, such as path length, path continuity and path energy. The selected path may be used to model and visualize the tubular along with key features, components and defects in 2D and 3D.

23 Claims, 10 Drawing Sheets

(51) Int. Cl.
*G01S 15/89* (2006.01)
*G06T 7/00* (2017.01)
*G06V 10/22* (2022.01)

(56) References Cited

U.S. PATENT DOCUMENTS

| | | | | |
|---|---|---|---|---|
| 2002/0106116 | A1* | 8/2002 | Knoplioch | G06T 7/60 |
| | | | | 382/128 |
| 2003/0056799 | A1* | 3/2003 | Young | G06T 7/12 |
| | | | | 600/425 |
| 2006/0241465 | A1* | 10/2006 | Huennekens | A61B 6/487 |
| | | | | 600/458 |
| 2007/0083099 | A1* | 4/2007 | Henderson | A61B 8/488 |
| | | | | 600/407 |
| 2008/0146925 | A1* | 6/2008 | Byrd | A61B 8/4427 |
| | | | | 600/438 |
| 2009/0093712 | A1* | 4/2009 | Busch | A61B 6/4441 |
| | | | | 606/159 |
| 2009/0278846 | A1* | 11/2009 | Gulsun | G06T 7/13 |
| | | | | 345/423 |
| 2011/0237934 | A1* | 9/2011 | Onishi | A61B 8/12 |
| | | | | 600/424 |
| 2014/0321240 | A1* | 10/2014 | Barnes | G01V 1/50 |
| | | | | 367/35 |
| 2015/0022523 | A1* | 1/2015 | Murray | G06T 15/08 |
| | | | | 345/426 |
| 2016/0066883 | A1* | 3/2016 | Mickelsen | A61B 8/12 |
| | | | | 600/463 |
| 2017/0296152 | A1 | 10/2017 | Niemiec | |
| 2019/0282199 | A1* | 9/2019 | Merritt | G06T 7/10 |

FOREIGN PATENT DOCUMENTS

| | | | | |
|---|---|---|---|---|
| WO | | 2016201583 | A1 | 12/2016 |
| WO | WO-2017062015 | A1 * | 4/2017 | ............ E21B 47/10 |
| WO | WO-2017199246 | A1 * | 11/2017 | ............ A61B 6/504 |

\* cited by examiner

```
// in this psuedocode we are tracing the path of the well lengthwise which will be
denoted as the z axis
// additionally, the well path is monotonic in theta and R propagateSeed(maxStep, maxFailedSteps, threshold, seed, straightness):
        paths, energy <- allocateArrays() // allocate paths array, energy array, and
failedSteps array (all x*z)
        z <- seed.z
        region <- [seed.R, seed.R] // inclusive range denoting active region
        energy[seed.R, seed.z] <- seed.energy
        endpoint <- seed
        while z is in volume:
                frame <- getFrame(z) // gets R*theta frame at depth z
                growRegion() // increase size of region by maxStep on either side within
frame
                for each R in region:
                        pR <- findPreviousMax(R) // find maximum value in energy within a
maxStep from R in previous frame
                        if energy[pR, z-1] != 0:
                                paths[R, z] <- pR // store path pointer
                                // calculate cost of step taking into account previous
energy, stepsize, straightness etc.
                                energy[R, z] <- costFunction(energy[pR, z-1], frame[R,
seed.theta], abs(R-pR), straightness)
                                if frame[R, seed.theta] > threshold:
                                        failedSteps[R, z] <- 0 //then reset the failed step to
zero
                                else:
                                        if failedSteps[pR, z-1] = 0:
                                                endpoint <- addEndPoint(R, z) // adds this as
the current end point if it accumulated more energy/distance
                                        failedSteps[R, z] <- failedSteps[pR, z-1] + 1
                                        if failedSteps[R, z] > maxFailedSteps:
                                                energy[R, z] <- 0
                                        else:
                                                energy[R, z] <- punishFunction(...) // function
to decrease energy of the failed path
                        else:
                                region <- tightenBounds() // tighten bounds of region
                z <- z + 1 endpoint <- addEndPoints(region, z) // updates maxPath with maximum end point in
region if accumulated energy is greater point <- endpoint
        while point.z >= seed.z:
                output point
                point.R <- paths[point.R, point.z]
                point.z <- point.z - 1 costFunction(previousEnergy, currentEnergy, stepSize, straightness):
        output previousEnergy + (currentEnergy / (stepSize + 1) ^ straightness) )
// '^' denotes exponentiated ie e^2 = e²
```

Fig. 5

SURFACE EXTRACTION FOR ULTRASONIC IMAGES USING PATH ENERGY

RELATED APPLICATIONS

This application claims priority to United Kingdom Application No. GB1914401.3, filed on Oct. 4, 2019, the disclosure of which is incorporated herein by reference in its entirety.

FIELD OF THE INVENTION

The invention relates generally to inspection of fluid-carrying conduits, in particular, acoustic sensors used to inspect pipelines and wellbores to create a visualization of them.

BACKGROUND OF THE INVENTION

Inspection of wells and pipes may be carried out using acoustic, especially ultrasound frequency, tools. The tool is deployed within and along the wellbore or pipe imaging the surface to detect ruptures, corrosion and other features which may be used to assess the state of the well or pipe, particularly to assess environmental impacts.

Existing ultrasound tools comprise an array of piezoelectric elements distributed radially around the tool housing. The top surface of each element faces radially away from the tool towards the wall of the well or pipe. The reflected waves are received by the same elements and the pulse-echo time of the waves are used to deduce the distances to the inner and outer walls. The tool may be that described in PCT Application WO 2016/201583 published Dec. 22, 2016 to Darkvision Technologies.

Each frame captures a cross-sectional slice of the well or pipe and successive frames are combined to capture 3D signals of the pipe or well, which may then be visualized. The signals tend to be noisy due to particles in the fluid, glints from wellbore edges, and axial decentralization of the tool with respect to the inner wall, both of which make it difficult for a computer to identify the surface for further processing or visualization.

While the inner surface often provides the brightest reflection, techniques that operate simply on brightness or edge detection tend to erroneously find many disconnected surfaces.

SUMMARY OF THE INVENTION

In order to better identify surfaces of tubulars a novel system and method are provided to select paths that are continuous, monotonic and contain pixels of high energy. A novel User Interface is provided to improve and customize the identification of paths.

In accordance with a first aspect of the invention there is provided a method of processing ultrasound data comprising the steps of: deploying an ultrasound imaging device within a tubular; acquiring ultrasound images of the tubular; processing the images to find a plurality of candidate paths, each candidate path passing monotonically through pixels of the ultrasound images and selected based on signal energy of the pixels; calculating a statistic of each candidate path; and identifying a surface of the tubular by selecting a candidate path based on the calculated statistic.

In accordance with a second aspect of the invention there is provided a system for imaging a tubular comprising: an imaging device deployable in the tubular and having an array of ultrasound transducers for acquiring ultrasound images of the tubular and a processor. The processor is arranged to: find a plurality of candidate paths, each candidate path passing monotonically through pixels of the ultrasound images and selected based on signal energy of the pixels; calculate a statistic of each candidate path; and identify a surface of the tubular by selecting a candidate path based on the calculated statistic.

In accordance with a third aspect of the invention there is provided a computer system for analyzing a surface of a tubular, the system comprising a user interface (UI), processor and memory. The UI comprises a display for providing a rendering of a surface of the tubular from ultrasound images and input means for receiving from a user a selection of pixels in the ultrasound images. The processor is arranged to receive the user-selected pixels, find multiple candidate paths through the ultrasound images that include the user-selected pixels and select one of the candidate paths as the new surface of the ultrasound image. The memory stores the ultrasound images, computed statistics for each of the candidate paths and reference to pixels comprised in each of the candidate paths.

Further aspects of the invention are set out below and in the appended claims. Thus preferred embodiments of the invention enable the system to visualize and analyze surfaces of the tubular.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

FIG. 5 is pseudocode for path finding in an ultrasound image.

DETAILED DESCRIPTION OF THE INVENTION

With reference to the accompanying figures, devices and methods are disclosed for capturing, processing, and storing ultrasound reflections from a fluid-carrying conduit by an ultrasound probe to determine a surface. The ultrasound probe 12 images 2D reflection data for plural frames which are combined to create a 3D volume of the tubular. The method is optimized to find a surface of the tubular by considering properties of candidate paths, such as continuity, length, cumulative energy and being monotonic.

This conduit may be a tubular for carrying hydrocarbons or water and having an elongate, cylindrical form factor through which the device can move longitudinally. The device typically also has an elongate form factor and is sized to be deployable within the well or pipe. Based on a priori expectations of the tubular geometry additional constraints and parameters are employable to find the optimal surface. For example, the system assumes: a) the tubular being imaged is cylindrical, so the polar images are monotonic; b) the radius is constant and known, so a seed point is set to the known radius and extended smoothly in the Z-axis, c) the tubular has some expected strain and thus straightness, which determines how far the path may wander in the Z-axis, d) the tool is inside the tubular and slightly decentralized, so the path can be modelled as a sinusoid with some limited wandering of the path in the radial direction; e) the tubular has a inner and outer surface, so two parallel paths are expected; and f) the tubular is a closed shape, so the path should wrap around in each cross-sectional frame.

Figure 1:
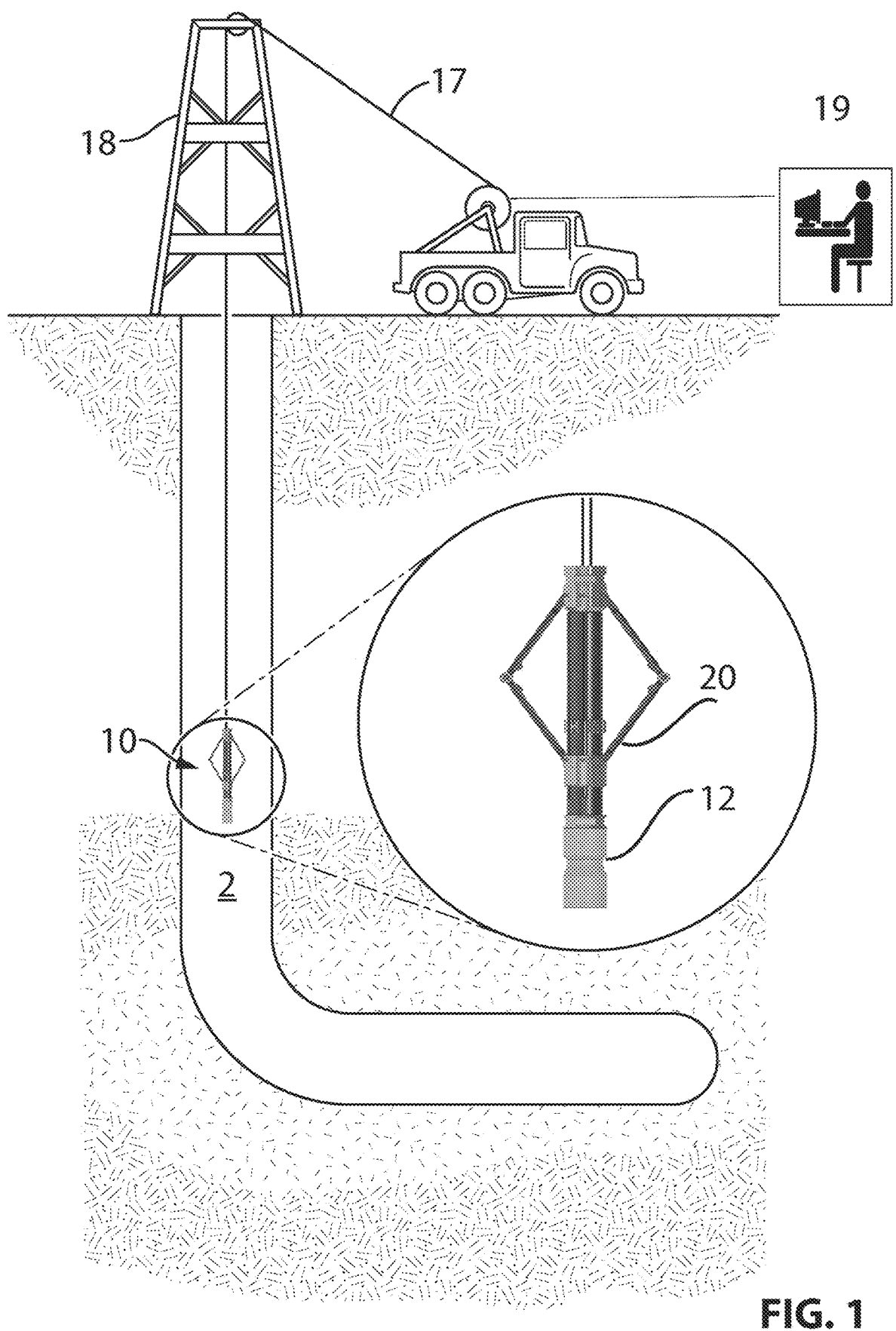
FIG. 1 is a cross-sectional view of an imaging device deployed in a wellbore in accordance with one embodiment of the invention.
Figure 2:
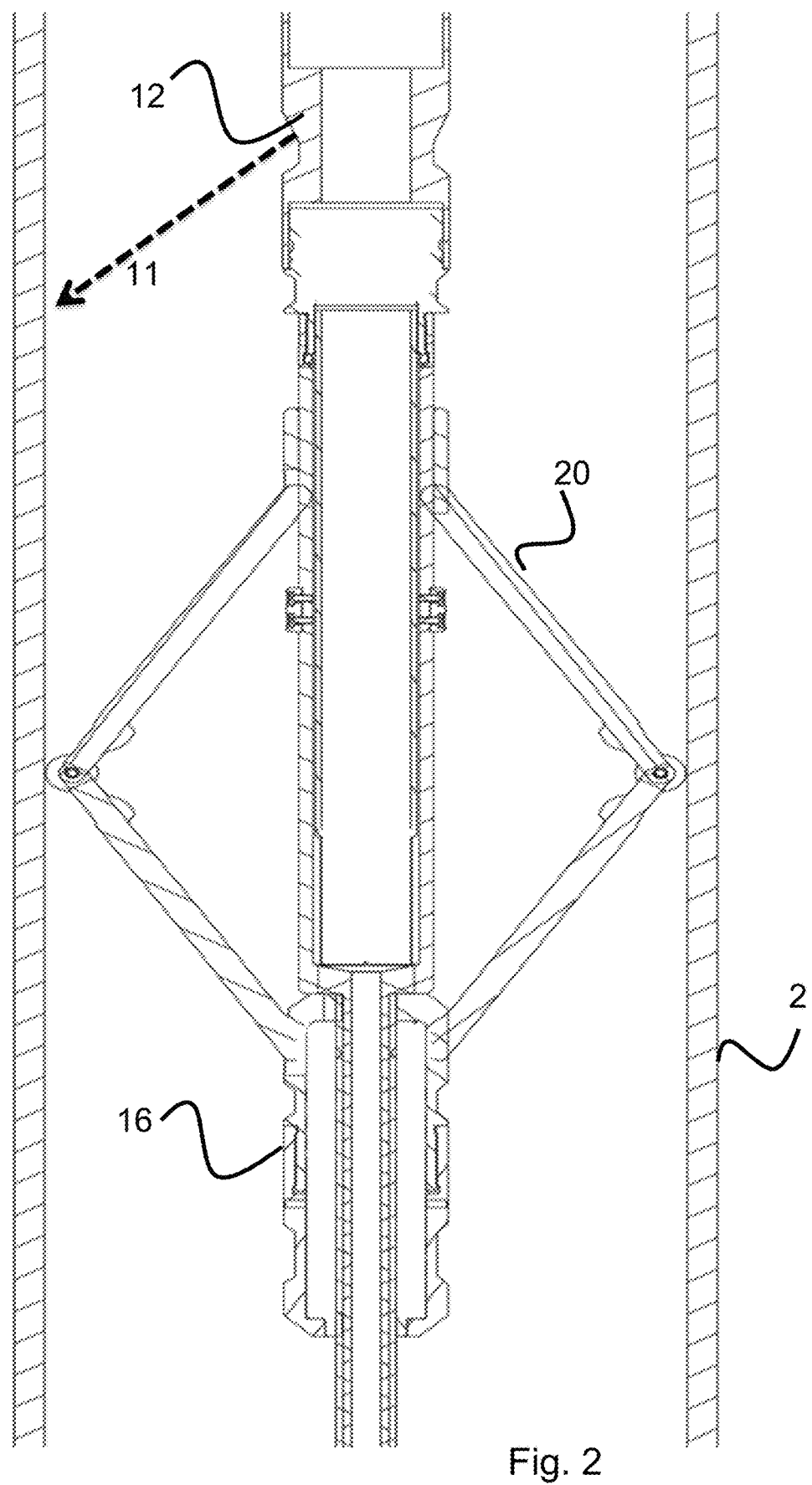
FIG. 2 is a cross-sectional view of an imaging device in a tubular.

In accordance with one embodiment of the invention, there is provided an imaging device 10 for imaging a fluid conduit 2, as illustrated in FIGS. 1 and 2. The imaging device 10 generally comprises a transducer array 12, a body 16, an on-board processor, and one or more centralizing elements 20. An operations site 18 deploys the device into the tubular and retrieves the data. The data is processed and visualized at a computer 19, normally remote from the operations site.

Figure 6:
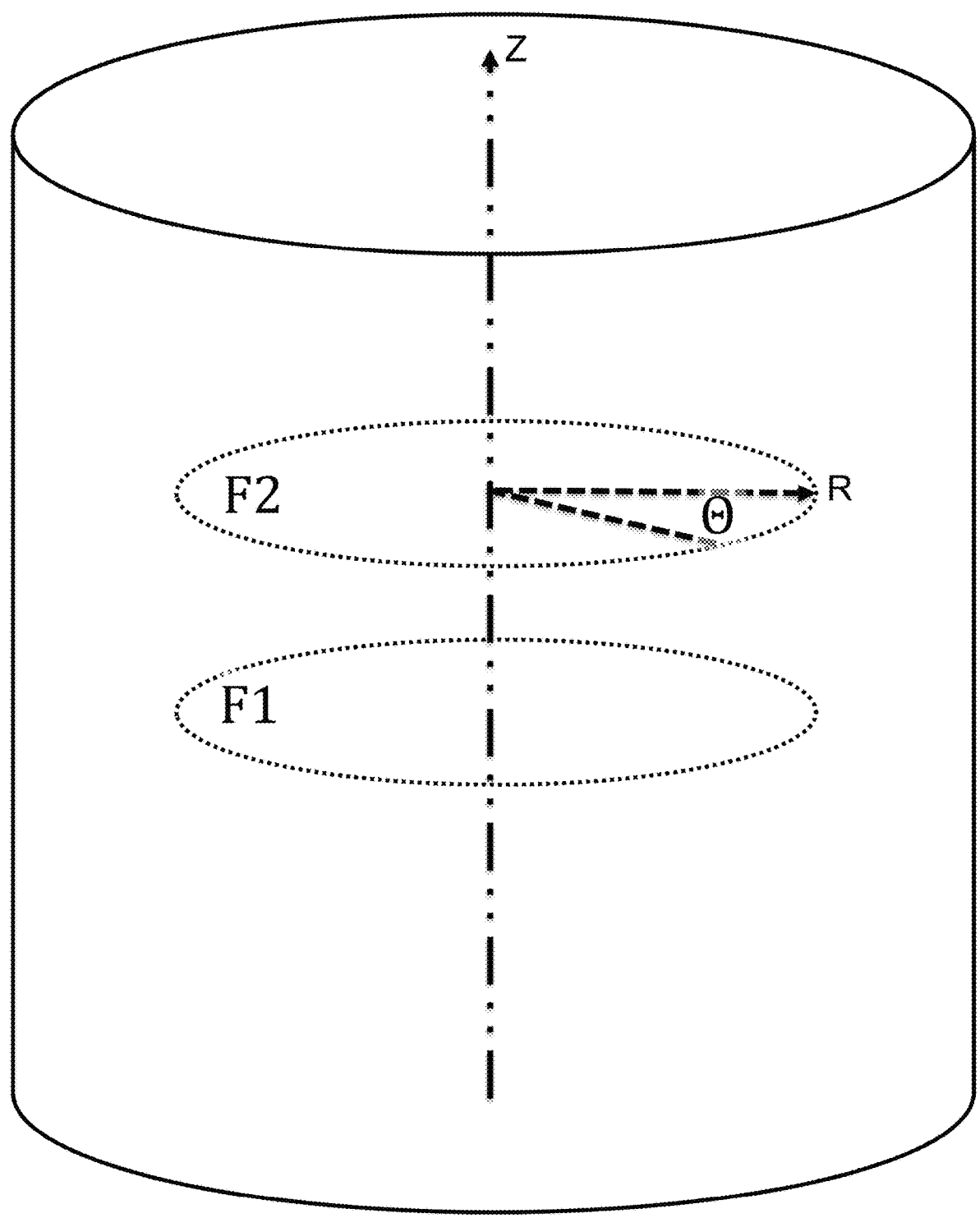
FIG. 6 is an illustration of a coordinate system for imaging tubulars.
Figure 7:
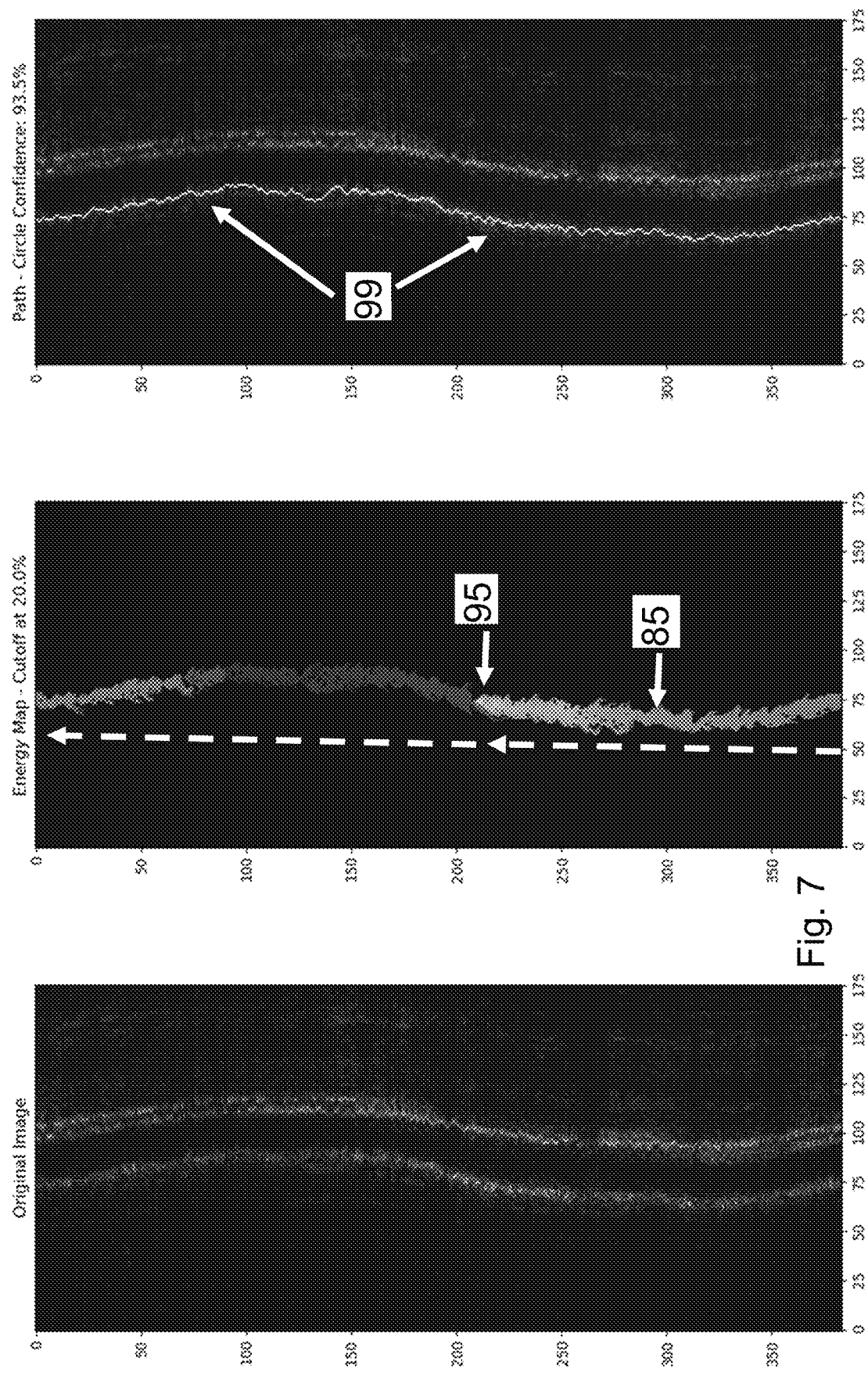
FIG. 7 is a graph of an ultrasound image, path energy, and optimal path.

Transducers arrays for capturing ultrasound images are discussed below. For clarity in explaining the present method, it is assumed that there is a 3D volume of ultrasound data made up of cross-sectional frames (i.e. in the R-Θ plane) of the tubular, which frames are stacked together and extend longitudinally (z). The native units for tubular volume may be cylindrical (R, Θ, Z) as shown in FIG. 6. Ultrasound reflections are sampled to capture both positive and negative pressures. The signals are demodulated to create images with pixels of absolute signal energy, for example using a Hilbert Transform. In the example of FIG. 7, a single frame comprises 380 scan lines ($\Theta_i$) by 175 samples (time or radius $R_i$), where the brightness of each pixel represents the reflected energy at that time and scan line.

The demodulated reflection signals shown in the original image of FIG. 7 contain two strong surface reflections, signal noise, particle reflections, and ringing surfaces of diminishing strength. The present method removes the noise and particles as discontinuous surfaces and finds paths thru the inner or outer surfaces where the signal energy is highest and contiguous, thus ignoring the erroneous reflections.

Figure 8:
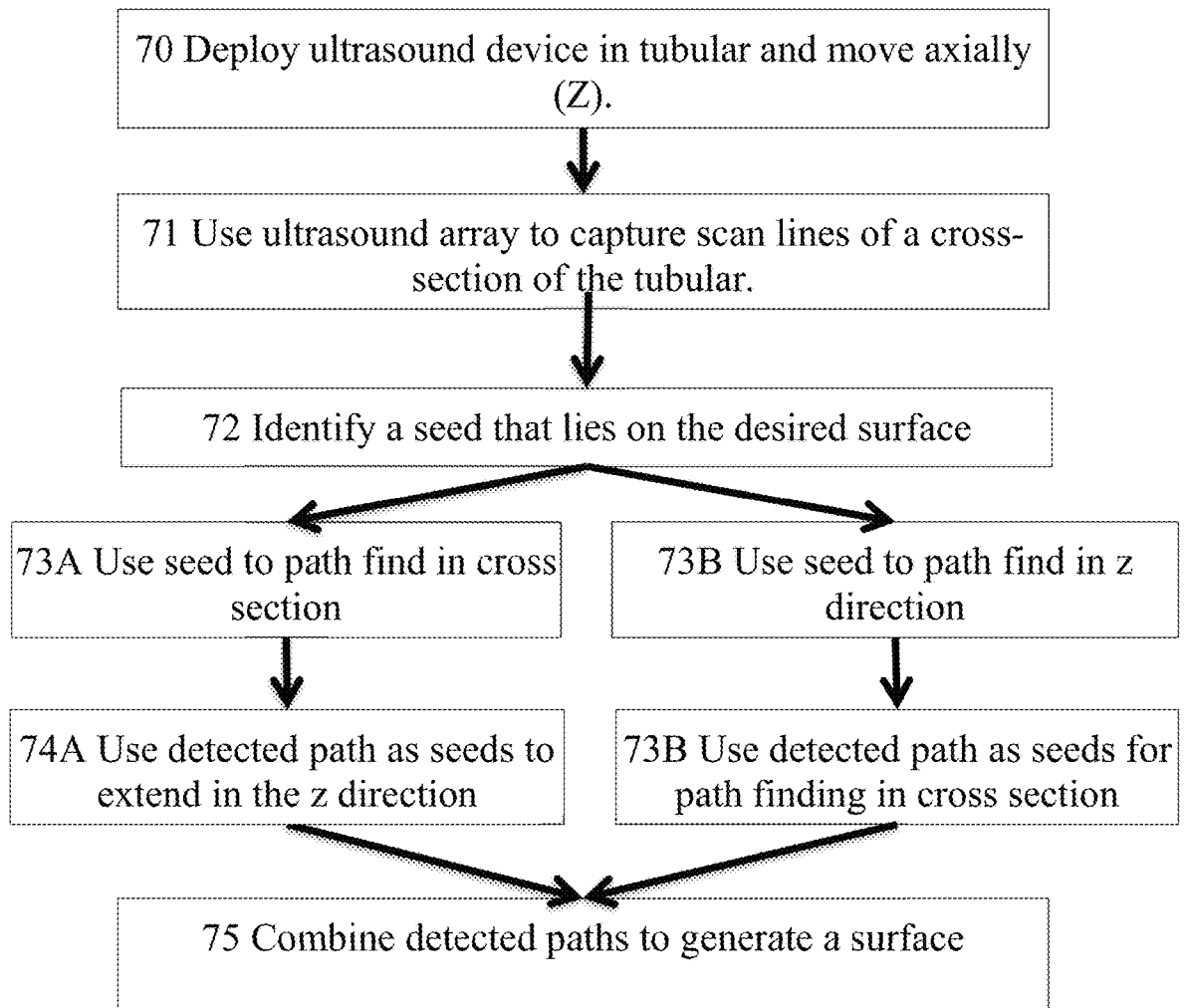
FIG. 8 is flowchart to generate a surface of a tubular from ultrasound images.

A path is a sequence of connected pixels. Paths may be connected and extend in the Z-axis (i.e. one pixel per frame) or extend circumferentially (i.e. one pixel per scan line). Paths are grown to pass thru high energy pixels, but the optimal path does not necessarily pass thru the highest energy pixels. The sum of the energies in a path is important, not the individual pixel energies. FIG. 8 is a flowchart for generating a surface from ultrasound images. The alternative methods for extending paths are shown by steps 73A and 74A versus 73B and 74B.

Note that the system does not grow the path in the radial dimension (i.e. along one scan line). Also since the first and last scan line in a frame are neighbors for a radial array, the path finding process is wrapped. See the dashed lines in FIG. 7 from seed pixel 95 to scan line 0, wrapped around to line 380, then continue to seed pixel 95. While there is no such longitudinal constraint, surface finding is preferably limited to some arbitrary section of the tubular from Z1 to Z2 (in units of depth or frame number).

The method could find every path thru adjacent pixels and compare them all to find a path of maximum energy. However, that is computationally expensive and so it is preferable to start with some seed pixel(s) 95, entered by a user or found automatically, and then grown up/down in Z or clockwise/counterclockwise in Θ.

A user interface embodiment is discussed below for receiving seed pixels. Alternatively the method selects one of more seed points that are likely to be on a good path. For example, the system may look for a) the highest energy pixel in the frame, b) highest energy pixel in a set scan line, c) collection of high energy pixels with some threshold pixel area, d) a pixel of a scan line at a radius where the tubular surface should be based on geometric knowledge, or e) pixels on an optimal path from a previous computation, such as the previous frame.

Thus from at least one seed pixel ($R_s$, $\Theta_s$, $Z_s$), the processor considers a region of nearby pixels from the next scan line (circumferential path) or from the next frame (Z-path). The region of pixels considered may be limited to at most one pixel on either side of a straight path, but more generally the region comprises n pixels on either side. The parameter 'straightness' helps determine how straight the path should be. A less straight path allows the method to consider noise and surface features further from the last pixel in the path.

After the first step from the seed point 95, there may be as many candidate paths to consider as the number of pixels in that region. Each candidate path will be associated with a path energy value. Some candidate paths may be pruned based on certain criteria, such as next pixels or paths with less than some threshold energy value. For subsequent steps, the number of candidate paths increases, and the width of pixels considered widens. The system cannot be sure early on whether paths with low cumulative energy will later prove to pass through higher energy pixels or have a longer path length.

It is worth noting that since the tubular may have ruptures, intentional perforations, and step changes, the best path will not necessarily be fully continuous or include the entire circumference. Indeed, such features are part of the inspection process, and thus the method incorporates termination conditions even for good candidate paths. Thus one statistic for selecting the best path is total path length.

The energy map of FIG. 7 shows all the pixels 85 under consideration, thru which many candidate paths can pass. This graph uses a 20% cutoff to ignore pixels that are less than 20% of the seed pixel or some predetermined energy value.

The system comprises a first data structure for storing the cumulated energy for all candidate paths and a second data structure containing the directed paths. The first structure may be a matrix, Energy (R, Θ), of cumulated energy up to pixel (R, Θ). Alternatively the first structure may comprise two arrays: one storing the previous energy for each path, and one storing the current energy. The processor may swap these arrays with each other for each iteration to obtain the same effect as the matrix, since it does not need the energy from two iterations ago.

The method may employ Dynamic Programming (DP) and iteratively consider local best paths to compute at each step. This may be done by considering the previous best path to continue thru each next pixel and only extend that path and ignoring computation for the other paths. At each step, the next row of pixel energies are loaded into a vector to compute against the energy matrix E of cumulative energy up to that step, whereby for each pixel(Ri, Θi), only the highest cumulative energy within the Region of previous pixels are added to the present pixel energy. These new added energies are now used in the Energy matrix E for the next step.

The second data structure stores references to pixels in candidate paths. This structure may be a matrix of pointers Path(R, Θ) to indicate the pixel coordinates, thru which the path was chosen at each step. The values in Path may be an integer of the relative offset of the pixel chosen for the best path at that step (e.g. "−2" would indicate the path went thru a point two pixels to the left, i.e. closer radius).

At the end of this process, the matrix E will contain all the cumulative energies of candidate paths that terminate at each end point. The method may simply choose the highest value as the optimal path and then use the Path( ) pointers to work backwards thru the pixels that led to this optimal path. The method then returns a set of pixels (R, Θ, Z) that define the optimal path, which becomes the surface to be rendered.

Alternatively, the system may store one path as the current optimal path. Whenever a path "fails" (i.e. reaches a pixel below the threshold) the system checks whether this failed path accumulated more energy or length than the current candidate path and replace it if so. Then at the end all remaining paths are compared for cumulative energy or length to select the optimal path as the surface of the tubular.

As discussed elsewhere, the optimal path may be selected by computing statistics about each candidate path, such as cumulative energy, path length (i.e. number of pixels in the path or number of pixels of some minimum energy), or goodness of fit to the expected geometry (i.e. a circular or cylindrical surface). The cumulative energy need not be simple addition, but instead it may be a costFunction( . . . ) that gives weights to other considerations. Additional logic may be used to make the path finding algorithm more robust to dead transducer elements and noise, such as reducing Energy( ) with a punishFunction( . . . ) rather than just terminating a candidate path.

In the above example, paths were first extended circumferentially (in Θ) for each frame. With appropriate modification, the method could find paths that extend first in the Z dimension (see pseudocode of FIG. 5).

A 2D surface may be found by finding paths that extend in another dimension than the first, preferably by using the pixels in the optimal path as seed pixels.

User Interface

Figure 9:
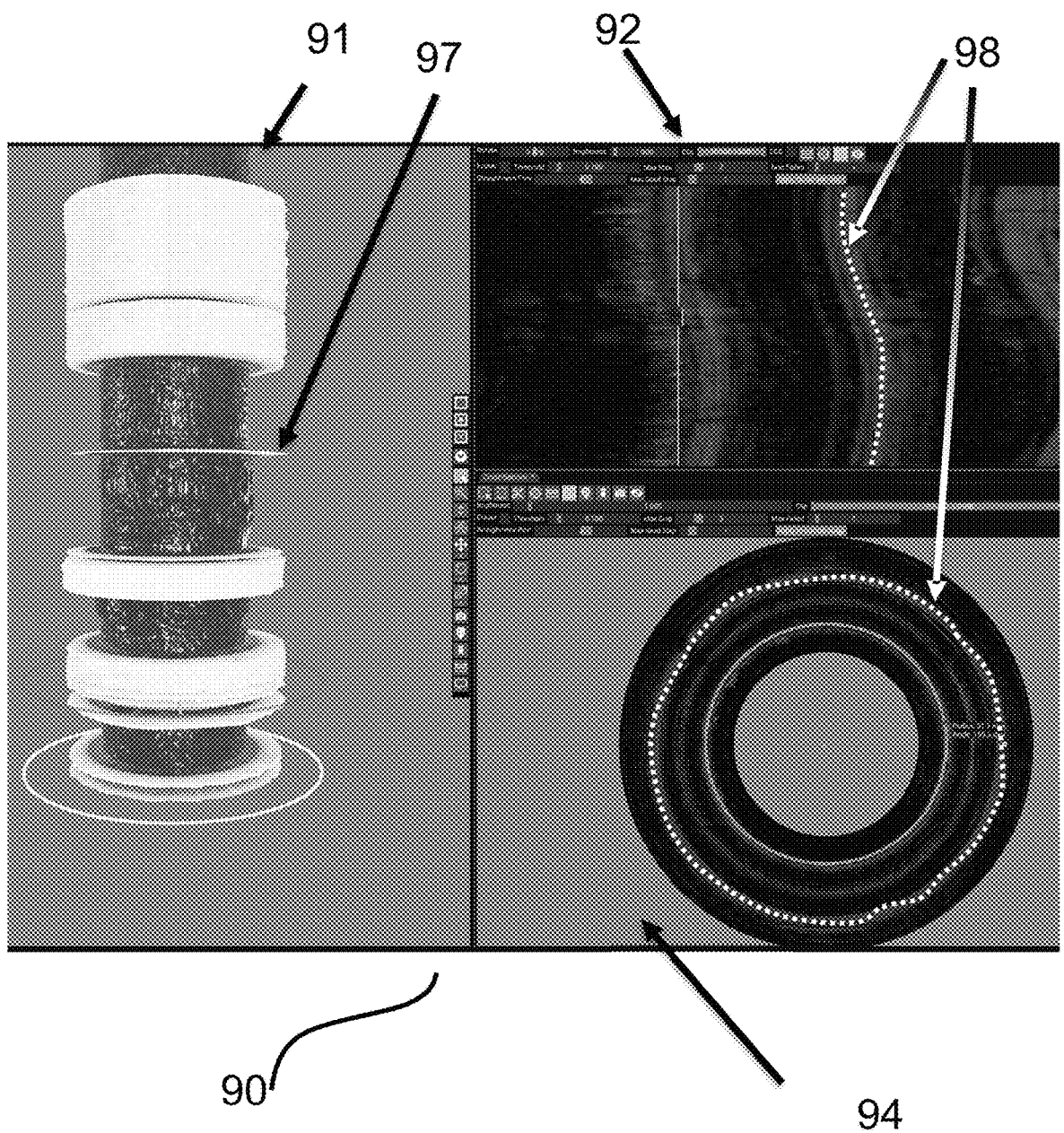
FIG. 9 is a user interface before providing manual seed pixels.

FIG. 9 shows a user interface (UI) 90 before manual seeding is entered. The three panels 91, 92, 94 show a rendering of the tubular's surface at 91, unwrapped ultrasound image in 92, and wrapped, centralized cross-section image in 94. In this initial display, the discontinuous signal noises are ignored but strong secondary reflections caused the system to find preferred (dotted) paths 98 at an outer radius for some frames such as frame 97. Thus the volume rendered in panel 91 is erroneously made from inner and outer traced paths. Before any seed pixels have been manually entered, the system automatically determines candidate paths 98 from certain seed pixels, based on some criteria such as global high energy.

As shown, a frame within the displayed section of tubular is selectable at plane 97 by the user for display in panels 92, 94. As the system has selected the wrong surface, the user is able to enter one or more seeds by clicking pixels within the panels 92 or 94. The UI converts the selected pixels from the display domain to pixels of the ultrasound image, preferably selecting ultrasound pixels based on high energy and proximity to the user-selected pixels. The seed pixels are sent as arguments to the path finding function, with other parameters selectable in the UI, such as straightness and thresholds.

Figure 10:
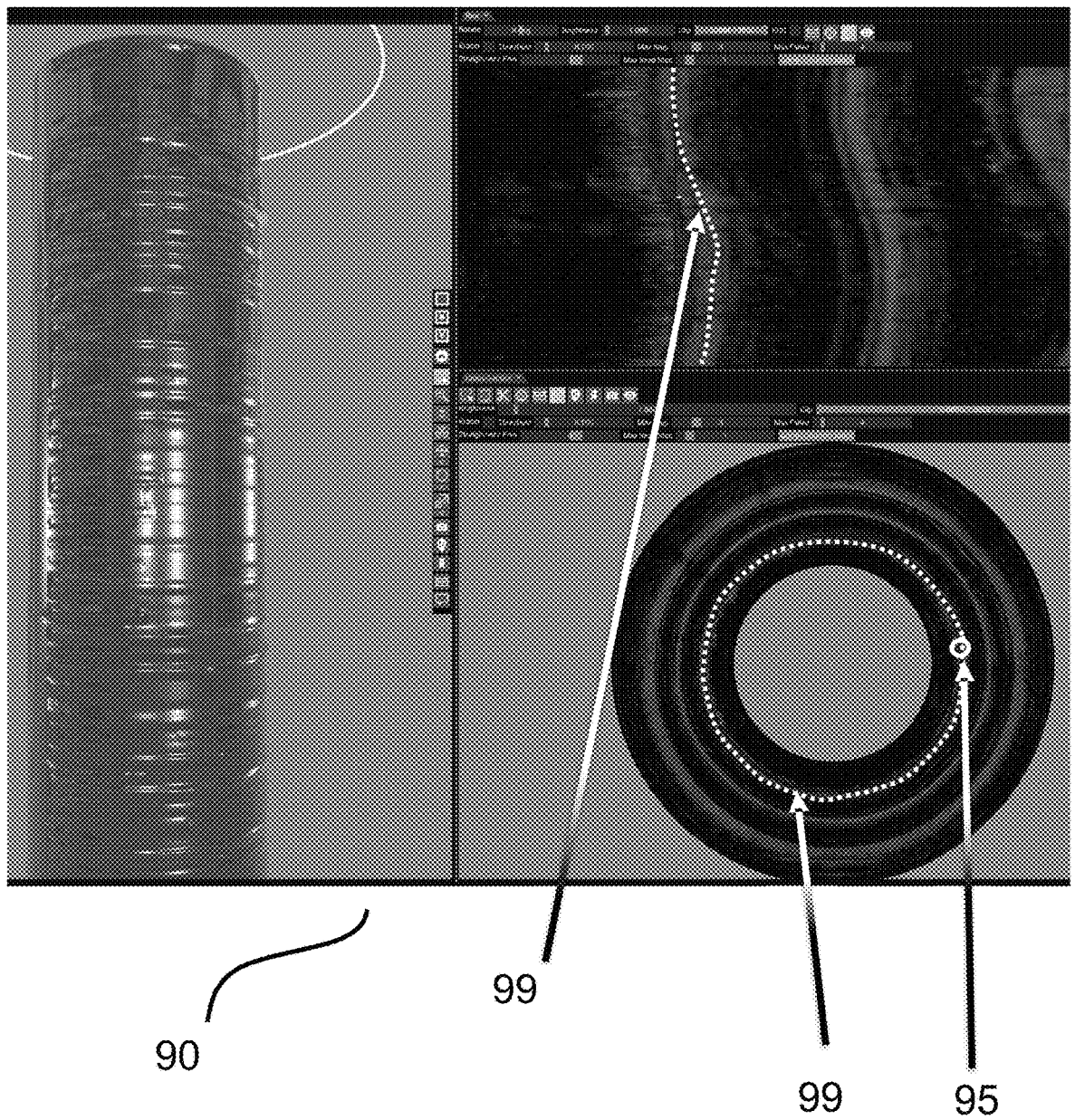
FIG. 10 is a user interface after surface finding with seed pixels.

FIG. 10 shows the UI 90 after seed pixels 95 have been selected by a user, which then determines path 99. This path may be extending in the Z dimension to improve the surface rendered in left panel 91. Thus the user has forced the system to find a path thru a seed point based on expert knowledge of the surface or a surface of interest. The UI further comprises inputs to control parameter of the method, such as straightness and threshold energy. Multiple seeds 95 may be entered via the UI for each cross-section and/or for multiple frames, thru which seeds the preferred path is selected to re-render the surface displayed in panel 91.

Transducer Array

Figure 3A:
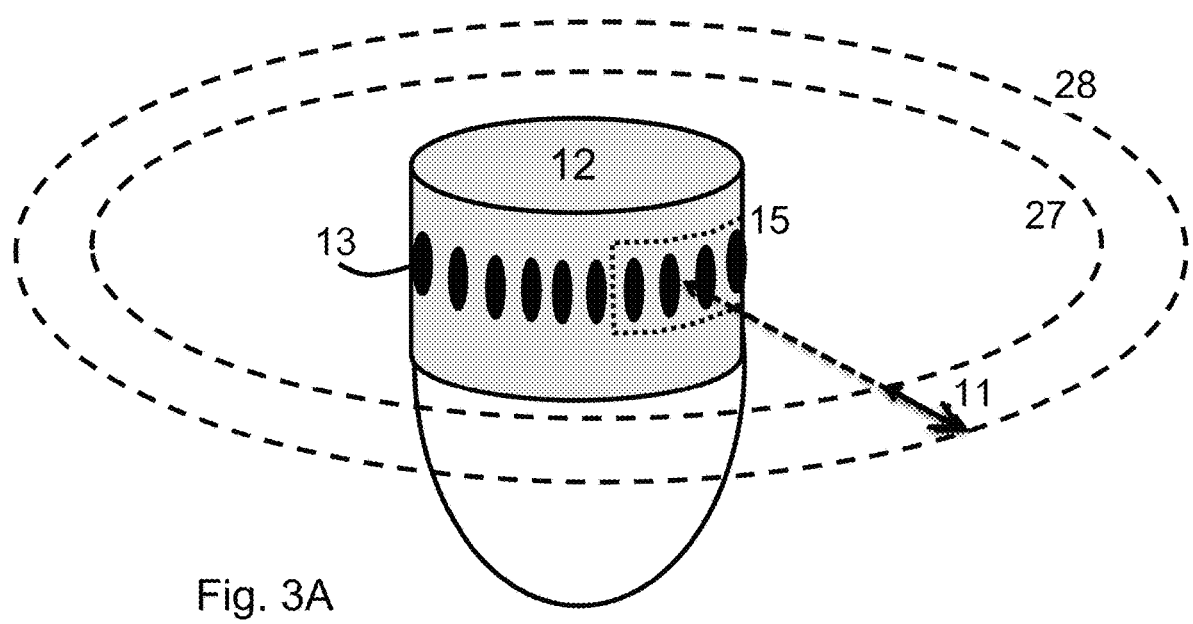
FIG. 3A is a perspective-view of a radial acoustic array and its imaging field.
Figure 3B:
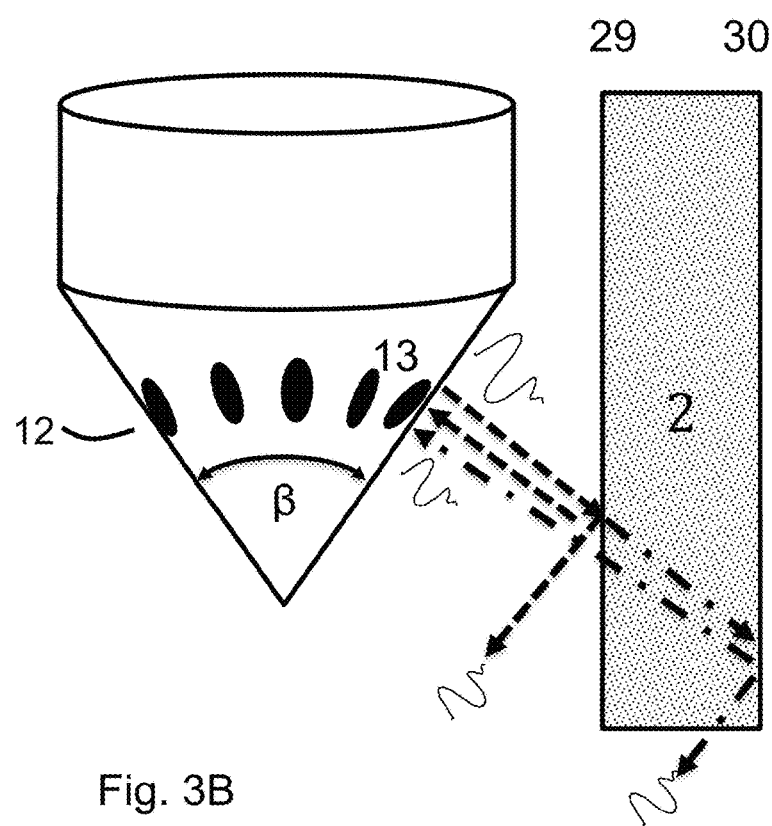
FIG. 3B is a perspective-view of a radial acoustic array in a conical arrangement.
Figure 4:
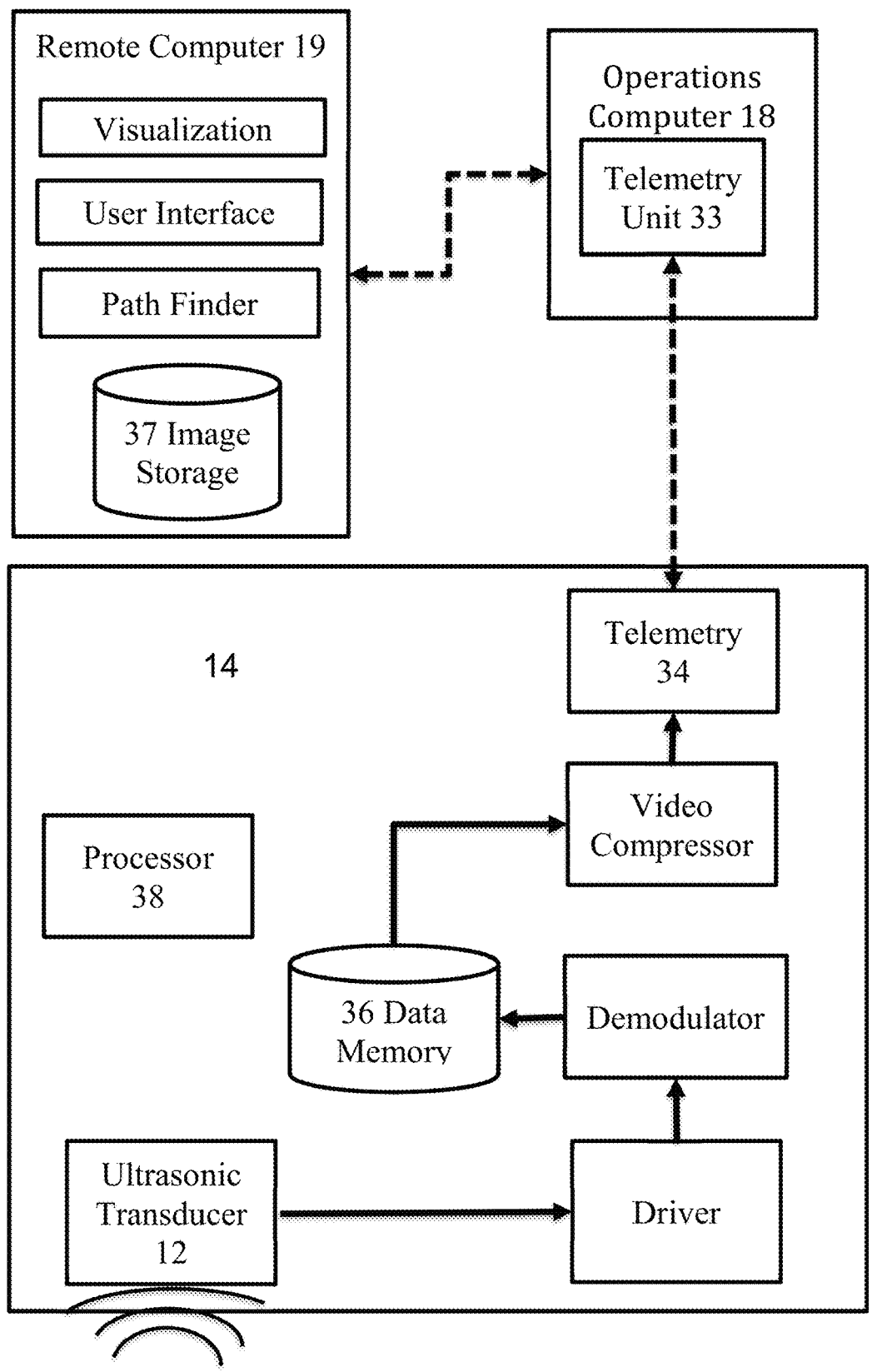
FIG. 4 is a block diagram for processing ultrasound data.

The array comprises a plurality of acoustic transducer elements 13, preferably operating in the ultrasound band, preferably arranged as an evenly spaced one-dimensional radial array (see FIGS. 3A, 3B). The frequency of the ultrasound waves generated by the transducer(s) is generally in the range of 200 kHz to 30 MHz, and may be dependent upon several factors, including the fluid types and velocities in the well or pipe and the speed at which the imaging device is moving. In most uses, the wave frequency is 1 to 10 MHz, which provides reflection from micron features. The transducers may be piezoelectric, such as the ceramic material, PZT (lead zirconate titanate). Such transducers and their operation are well known and commonly available. Circuits 14 to drive and capture these arrays are also commonly available.

The number of individual elements in the transducer array affects the azimuthal resolution of the generated images. Typically, each transducer array is made up of 32 to 2048 elements and preferably 128 to 1024 elements. The logging speed and frame rate determines the axial resolution. Multiple transducer elements, per aperture 15, operate in a phase delayed mode to generate a scan line. There may be as many scan lines as elements by changing the aperture by a single element for each scan line.

The transducer elements 13 may be distributed radially, equidistant around the body of the device. As seen in FIG. 3A, the transducer elements 13 may be substantially outward, radially-facing. A first reflection is received from the inner wall and then a second reflection is received from the outer wall. However, there may be multiple reflections as the wave bounces between walls. The bottom-most plot of FIG. 7 is an example of such reflection signals from an inner wall, outer wall and particles in the fluid. Decentralization of the imaging device makes the circular cross-section appear sinusoidal in this unwrapped image.

This transducer arrangement captures a ring-shaped cross-sectional slice (from 27 to 28) of the well covering 360° around the array 12 and is useful for thickness measurements. As the device is moved axially in the well or pipe, in either direction, the ring-shaped transducer continually captures slices of the well that are perpendicular to the longitudinal axis of the well (see FIG. 7). Thousands of these slices are combined to create a 3D visualization of the well.

In the alternative arrangement of FIG. 3B, the transducer elements are distributed on a frustoconical surface with elements 13 facing partially in the longitudinal direction of the device, (and thus in the longitudinal direction when in the well). Thus, the radial transducers are angled uphole or downhole to form an oblique-shaped conical field of view. The cone may have a cone angle β of 10-45°, preferably about 20°. In this arrangement, much of the sound wave reflects further downward, but a small portion backscatters off imperfection on the surfaces or voids within the wall back towards the transducer. FIG. 3B shows acoustic pulses (moving in the direction of the dashed lines) transmitted towards inner wall, most of which bounces downward and some backwards to the transducer 13. Some of the wave energy (dot-dashed lines) propagates to the outer wall, then bounces downward and partially back to the transducer.

This conical design may also face uphole, i.e. towards the proximal end of the device and the operator. The array 12 may be located at an end of the device (e.g. FIGS. 3A, 3B) or between the ends (e.g. FIG. 2).

Alternative Probes

The radial phased-array probe is one way to capture a 3D volume for a tubular, comprising a plurality of cross-sectional frames stacked together. However, the 3D volume may be captured using alternative probe designs, from which 2D surfaces are found as described herein. While the data format and native coordinate system may differ from that described above, the data may be converted as needed or the logic modified to find a path in that coordinate system.

In one alternative, the probe may be a spinning head probe, in which a single transducer element is rotated about the device's main axis, while logging along that axis to image the tubular in a helical fashion.

In another alternative, the probe may have a 2D surface of transducer elements

In yet another alternative, the probe may be a longitudinal linear array. A linear array is disclosed in GB1813356.1 titled "Device and Method to Position and End Effector in a Well" by Darkvision Technologies, incorporated herein in its entirety. This array may be robotically moved in a monotonic direction to capture a 3D volume of ultrasonic data.

The skilled person will appreciate that many probe designs are contemplated that capture a 3D volume and compatible with the method described.

Deployment System

The imaging device includes a connection to a deployment system for running the imaging device 10 into the well 2 and removing the device from the well. Generally, the deployment system is wireline 17 or coiled tubing that may be specifically adapted for these operations. Other deployment systems can also be used, including downhole tractors and service rigs.

The detected surfaces may be stored on a non-volatile memory of the device, i.e. the device operated as a Memory Tool. The detected surfaces may be transmitted over a telemetry unit of the device to a corresponding telemetry unit of the surface computer system. Advantageously, processing the ultrasound images on-tool in real-time reduces the amount of data to store or transmit. Thus each scan line captured over T time-samples, each sample of m-bit depth (e.g. 1024 sample, 12-bit) is reduced to a simple p-bit value for the radius of the detected surface, where p is less than m. The tubular may be visualized and modeled based on the detected and stored surface's radii, without the remaining noise and secondary reflections. Preferably, the operator (external to the tubular) inputs seed pixels in real-time, which are transmitted back to the tool to compute the paths to send up to the operator. Thus a tubular of several kilometers may be logged and visualized in real-time using this repeated feedback mechanism.

In may be preferable in such implementations to perform path detection on a cross-section first basis (instead of extending in Z first) in order to transmit an image of the surface because the tool is being deployed longitudinally (in the Z-dimension) of the tubular. Thus the operator can view the tubular in real-time without waiting for the next frame(s) to be captured.

Without loss of generality, each of these components may comprise multiples of such chips, e.g. the memory may be multiple memory chips. For the sake of computing efficiency, several of the functions and operations described separately above may actually by combined and integrated within a chip. Conversely certain functions described above may be provided by multiple chips, operating in parallel.

It will be appreciated that data processing may be performed with plural processors: on the device, at the operations site, and preferably on a remote computer operated by a user. The term 'processor' is intended to include computer processors, cloud processors, microcontrollers, firmware, GPUs, FPGAs, and electrical circuits that manipulate analogue or digital signals. While it can be convenient to process data as described herein, using software on a general computer, many of the steps could be implemented with purpose-built circuits. In preferred embodiments of the present system, the device processing circuit 14 provides signal conditioning, data compression and data storage, while the operations 18/remote 19 processor provides data decompression and image processing.

It will be appreciated that the various memories discussed may be implemented as one or more memory units. Non-volatile memory is used to store the compressed data and instructions so that the device can function without continuous power. Volatile memory (RAM and cache) may be used to temporarily hold raw data and intermediate computations.

Computer Program Listings

Processing for finding surfaces from paths in ultrasound data may be performed in software or firmware. A software implementation in pseudocode is provided in FIG. 5 to aid in understanding the logic described above. The skilled person will appreciate that the code provided is part of a larger program that would be written or imported to run properly.

This algorithm takes from the UI an array of seed pixels and parameters maxStep, maxFailed Steps, threshold and straightness. It then propagates candidate paths in the Z-dimension, assuming the well path is monotonic in Θ and R. Each candidate path in the energy array accumulates energy using a costfunction( ). A path may be dropped if it fails certain criteria, such as threshold energy and encounters more than a number of dead pixels. A path's energy may be reduced by a punishfunction( ) for occasionally failing.

An example costfunction( ) is shown but other implementations are possible for this and the punishfunction( ) to ensure that a path follows certain assumptions and limitation of a tubular.

Successful paths continue to grow with the path history noted in the paths array. The path with the maximum length may be selected for the final path to output. The logic is repeated in a similar fashion to find contiguous circular paths in each frame given the seed point in a given frame from the output above. The algorithm may also repeat this logic for both directions away from a seed point (up/down in Z or clockwise/counterclockwise in the radial-Θ plane). The output will then be a 2D cylindrical surface, i.e. a plurality of circular paths The remaining ultrasound signals (i.e. those not on the selected path/surface) are effectively filtered out or masked from subsequent data processing.

Additional logic (not shown) may consider conditions for incorporating multiple seeds. For example, the system may find candidate paths from a first seed pixel and select the path that contains a second seed pixel then, regardless of accumulated energy or path length. Preferably the multiple seeds are pre-arranged in monotonic ascending order from first to second to Nth seed.

Rendering

After the contiguous path finding has led to a 2D surface, a visualization module renders a representation of the tubular for the UI. This module may receive all the ultrasound pixels contained in the 2D surface, using their location (R, Θ, Z) and intensity, but preferably a global intensity value is used for all pixels in the surface. The cross-sectional frames are wrapped around to create a generally cylindrical shape, whose radius is scaled by time of flight of the wave. Thus although the path finding algorithm may consider pixels two pixels away, the visualization module may create a smooth transition between actual pixel locations for the purpose of the UI.

The visualization module may further apply smoothing of the pixel for the rendered image and apply a surface texture. The rendered volume may also be converted to a 3D geometric model, from which measurements may be made. For example, the UI may provide a caliper tool to determine distances between points selected by the user. Advantageously the pixels selected are less ambiguous that the raw data because there are less false surfaces and noisy pixels visible for selection.

Terms such as "top", "bottom", "distal", "proximate" "downhole", "uphole", "below," "above," "upper, downstream," are used herein for simplicity in describing relative positioning of elements of the conduit or device, as depicted in the drawings or with reference to the surface datum. Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method of processing ultrasound data comprising the steps of:
    deploying an ultrasound imaging device within a tubular;
    acquiring ultrasound images of the tubular;
    processing the images to find a plurality of candidate paths, each candidate path passing monotonically through pixels of the ultrasound images and selected based on signal energy of the pixels;
    calculating a statistic of each candidate path; and
    identifying a surface of the tubular by selecting a candidate path based on the calculated statistic.

2. The method of claim 1, wherein the ultrasound images are comprised of a plurality of cross-sectional frames of the tubular.

3. The method of claim 1, wherein the calculated statistic is cumulative signal energy or length of pixels in that path and
    selecting a candidate path is based on highest cumulative signal energy or longest length of pixels.

4. The method of claim 1, wherein the candidate paths are monotonically extended in a circumferential and longitudinal dimension of the tubular to represent 2D surfaces.

5. The method of claim 1, wherein each image comprising scan lines in a first dimension and scan samples in a second dimension, orthogonal to the first and the processing proceeds through neighbouring scan lines to find candidate paths.

6. The method of claim 1, further comprising determining one or more seed pixel(s) through which the candidate paths pass.

7. The method of claim 6, wherein the one or more seed pixel(s) are input by a user via a User Interface.

8. The method of claim 6, wherein the one or more seed pixel(s) are automatically selected, preferable based on a known geometry of the tubular or energy of individual pixels in the ultrasound image.

9. The method of claim 1, further comprising masking pixels comprised in the identified surface then identifying a second surface in the ultrasound image, substantially parallel to the first surface.

10. The method of claim 1, further comprising one or more conditions for terminating extension of candidate paths, based on energy thresholds.

11. The method of claim 1, further comprising storing the computed statistic or pixel references for each candidate path in a memory.

12. A system for imaging a tubular comprising:
    an imaging device deployable in the tubular and having an array of ultrasound transducers for acquiring ultrasound images of the tubular and
    a processor arranged to:
        find a plurality of candidate paths, each candidate path passing monotonically through pixels of the ultrasound images and selected based on signal energy of the pixels,
        calculate a statistic of each candidate path; and
        identify a surface of the tubular by selecting a candidate path based on the calculated statistic.

13. The system of claim 12, wherein the array is a radial outward-facing array.

14. The system of claim 12, the device further comprising non-volatile memory for storing the identified surface.

15. The system of claim 12, the device further comprising telemetry unit for communicating the identified surface to a remote computing device.

16. The system of claim 12, further comprising a data structure for storing cumulative energies of candidate paths.

17. The system of claim 12, further comprising a data structure for referencing pixels of candidate paths.

18. The system of claim 12, wherein the calculated statistic is cumulative signal energy or length of pixels in that path and
    selecting a candidate path is based on highest cumulative signal energy or longest length of pixels.

19. The system of claim 12, wherein the candidate paths are monotonically extended in a circumferential and longitudinal dimension of the tubular to represent 2D surfaces.

20. The system of claim 12, wherein each image comprising scan lines in a first dimension and scan samples in a second dimension, orthogonal to the first and the processing proceeds through neighbouring scan lines to find candidate paths.

21. The system of claim 12, wherein the processor is further arranged to determine one or more seed pixel(s) through which the candidate paths pass.

22. The system of claim 21, further comprising a User Interface for inputting the one or more seed pixels by a user.

23. The system of claim 12, wherein the processor is further arranged to terminate extension of candidate paths, based on energy thresholds.

* * * * *